United States Patent
Stobby

(10) Patent No.: US 11,383,490 B2
(45) Date of Patent: Jul. 12, 2022

(54) POLYURETHANE OR POLYISOCYANURATE FOAM LAMINATE WITH ALUMINUM FACER AND BROMINATED PRIMER LAYER

(71) Applicant: DDP SPECIALTY ELECTRONIC MATERIALS US, LLC, Wilmington, DE (US)

(72) Inventor: William G. Stobby, Ann Arbor, MI (US)

(73) Assignee: DDP SPECIALTY ELECTRONIC MATERIALS US, LLC

( * ) Notice: Subject to any disclaimer, the term of this patent is extended or adjusted under 35 U.S.C. 154(b) by 14 days.

(21) Appl. No.: 16/954,437

(22) PCT Filed: Dec. 19, 2018

(86) PCT No.: PCT/US2018/066440
§ 371 (c)(1),
(2) Date: Jun. 16, 2020

(87) PCT Pub. No.: WO2019/126292
PCT Pub. Date: Jun. 27, 2019

(65) Prior Publication Data
US 2021/0086479 A1    Mar. 25, 2021

Related U.S. Application Data

(60) Provisional application No. 62/607,364, filed on Dec. 19, 2017.

(51) Int. Cl.
| B32B 15/04 | (2006.01) |
| B32B 5/20 | (2006.01) |
| B32B 7/12 | (2006.01) |
| B32B 15/20 | (2006.01) |
| B32B 27/06 | (2006.01) |
| B32B 27/38 | (2006.01) |
| B32B 27/40 | (2006.01) |

(52) U.S. Cl.
CPC .............. *B32B 15/046* (2013.01); *B32B 5/20* (2013.01); *B32B 7/12* (2013.01); *B32B 15/20* (2013.01); *B32B 27/065* (2013.01); *B32B 27/38* (2013.01); *B32B 27/40* (2013.01); *B32B 2255/06* (2013.01); *B32B 2255/24* (2013.01); *B32B 2255/26* (2013.01); *B32B 2266/0278* (2013.01); *B32B 2307/304* (2013.01); *B32B 2307/732* (2013.01); *B32B 2363/00* (2013.01); *B32B 2375/00* (2013.01)

(58) Field of Classification Search
None
See application file for complete search history.

(56) References Cited

U.S. PATENT DOCUMENTS

| 4,727,107 A | 2/1988 | McConnell et al. |
| 5,066,752 A * | 11/1991 | Favstritsky ........... C08F 212/21 526/293 |
| 6,995,193 B1 * | 2/2006 | Fukui ....................... C09J 7/38 522/102 |
| 2009/0291291 A1 * | 11/2009 | Epple ....................... C09J 7/28 428/317.3 |
| 2012/0295095 A1 | 11/2012 | Sheng |

FOREIGN PATENT DOCUMENTS

| CN | 102127269 A | 7/2011 |
| CN | 206357726 U | 7/2017 |
| WO | 1992007915 A1 | 5/1992 |
| WO | 2007149613 A1 | 12/2007 |
| WO | 2016011444 A1 | 1/2016 |
| WO | WO-2016011444 A1 * | 1/2016 ............ B32B 37/15 |

OTHER PUBLICATIONS

PCT International Search Report, dated Feb. 19, 2019, for International Application No. PCT/US2018/066440, filed Dec. 19, 2018; ISA/EPO; Sarah Girard, Authorized Officer.

* cited by examiner

*Primary Examiner* — Chinessa T. Golden

(57) ABSTRACT

An article contains a polyurethane or polyisocyanurate foam having a primary surface, an aluminum facer covering, and a primer layer between and attached to the primary surface of the foam and the aluminum facer; wherein the article is characterized by: (a) the primer layer having a concentration of bromine in said primer layer, comprising a primer component and a brominated component, where the primer component and brominated component are the same or different components; (b) the primer layer is free of chlorinated components; and (c) an absence of fibers in the form of fiber mats, fiber fabrics and dispersed fibers between the polyurethane or polyisocyanurate foam and the facer. Such an article shows performance in a fire test equivalent to or better than a laminate article where the bromine is dispersed in the polyurethane or polyisocyanurate foam, at lower total bromine content.

15 Claims, No Drawings

POLYURETHANE OR POLYISOCYANURATE FOAM LAMINATE WITH ALUMINUM FACER AND BROMINATED PRIMER LAYER

This application claims the benefit of U.S. Provisional Application No. 62/607,364, filed Dec. 19, 2017.

BACKGROUND OF THE INVENTION

Field of the Invention

The present invention relates to a polyurethane or polyisocyanurate foam laminate that comprises a polyurethane or polyisocyanurate foam attached to an aluminum foil facer with a brominated primer layer between the foam and the aluminum foil facer.

Introduction

Laminated articles comprising a polyurethane (PUR) or polyisocyanurate (PIR) foam core with an aluminum facer and a primer layer therebetween are common thermally insulating articles used in building and construction. For example, The Dow Chemical Company offers such a laminate article under their "THERMAX" ™ trade name. Fabrication of such a laminated article includes coating an aluminum facer with the primer layer containing a primer. A polyurethane or polyisocyanurate foam formulation is deposited onto the primer layer-coated aluminum facer surface and both binds to the primer in the primer layer and forms a PUR/PIR foam.

A challenge with PUR/PIR foam laminate articles having aluminum facers is that excessive heating of the foam can drive gasses out from the foam to a location between the foam and facer, resulting in formation of a bubble (blister) in the facer as it delaminates from the foam. Such a phenomenon occurs, for instance, when the PUR/PIR foam laminate is exposed to fire. Fire conditions cause the cell walls of the foam to rupture, driving the blowing agent out of the foam whereupon it is trapped between the aluminum facer and foam. When sufficient gas pressure exists, the gas causes localized delamination of the facer from the foam and a blister forms. In a fire condition, multiple such blisters can form on a surface of a PUR/PIR foam laminate. As continued exposure to fire causes the blisters to rupture, gas in the blister is released proximate to the fire. If the gas is flammable, rupturing the blister adds fuel to the fire and intensifies the fire. Current typical blowing agents are flammable hydrocarbons such as cyclopentane, isopentane and 2,3-dimethylbutane, so blister gas tends to be flammable.

One way to address the challenge of intensifying a fire through rupturing of such blisters is to use a brominated blowing agent in the formation of the PUR/PIR foam. For example, n-propyl bromide (nPB) is a brominated blowing agent used in PUR/PIR foam to reduce the flammability of the foam-foil laminates. When the blowing agent is driven from the foam to form blisters in the foil facer, the gas in the blister comprises the nPB. Brominated components like nPB serve as flame retardants so that when a blister containing nPB is ruptured proximate to a fire, the gas actually impedes the fire as bromine is released because bromine radicals form, which inhibit combustion. However, brominated blowing agents are subject to environmental scrutiny, so it is desirable to find an alternative means than halogenated blowing agents for introducing bromine into blister gas, more desirably to achieve a similar level of bromine relative to hydrocarbons in the blister gas without using nPB. And, since hydrocarbons serve as a fuel, the ratio of hydrocarbon to bromine in the blister gas is desired to be low and similar to the ratio for articles made with nPB. Furthermore, it is desirable to reduce the total amount of bromine in the laminate article without diminishing the amount of bromine in the blister gas.

BRIEF SUMMARY OF THE INVENTION

The present invention provides a solution to the problem of providing a laminate article of a PUR/PIR foam, an aluminum foil facer and primer therebetween that achieves a level of bromine in blisters between aluminum foil facer and PUR/PIR foam of a laminate article in fire conditions equivalent to when nPB is present as a blowing agent for the PUR/PIR foam, but without requiring a brominated blowing agent and while reducing the overall amount of bromine in the laminate article. Moreover, the invention provides a similar concentration of bromine in the blister gas relative to hydrocarbons in the blister gas. Such is the primary objective of the present invention.

The present invention is a result of surprisingly and unexpectedly discovering that brominated material can be used as part of the primer layer rather than as a blowing agent within the foam to achieve the primary objective stated above. As a result, bromine can be concentrated in the primer layer proximate to where it is needed for blister gas and less overall bromine can be present in the laminated article while achieving similar hydrocarbon to bromine ratios in the blister gas compared to bromine sourced from a brominated blowing agent in the foam.

The present invention is a result of an hypothesis that bromine in the blister gas of the nPB-containing laminate originates primarily from the foam up to a depth about 6 millimeters below the surface. Based on this hypothesis, bromine present in the foam at depths greater than 6 millimeters below the surface does not contribute to the blister gas and is therefore "superfluous". Hence, selectively positioning bromine proximate to the surface of the foam where the blisters form utilizes the bromine more efficiently and the same amount of bromine in the blister gas can be achieved without wasting bromine deeper into the core of the foam. Such a hypothesis was confirmed with the present invention.

Moreover, it was surprisingly discovered that the primer layer, where the actual blister forms, could contain most or all of the bromine necessary to achieve bromine in the blister gas at concentrations equivalent to much higher total bromine loadings in the foam when nPB is used, yet without using any nPB or other brominated blowing agent in the laminate. The primer layer can contain a blend of primer and brominated component and/or the primer itself could be a brominated material.

The present invention is a laminate article comprising a PUR/PIR foam, an aluminum facer over a primary surface of the foam and a primer layer there between, where the PUR/PIR foam is free of brominated flame retardants capable of introducing bromine into the released hydrocarbon blowing agent and the primer layer comprises a primer component and a brominated component. The primer component and the brominated component can be one and the same, or they can be separate, but intimately blended components.

In a first aspect, the present invention is an article comprising a polyurethane or polyisocyanurate foam having a primary surface, an aluminum facer covering, and a primer layer between and attached to the primary surface of the polyurethane or polyisocyanurate foam and the aluminum facer; wherein the article is characterized by: (a) the primer layer comprising a primer component and a brominated component, where the primer component and brominated component are the same or different components; (b) the primer layer is free of chlorinated components; and (c) an absence of fibers in the form of fiber mats, fiber fabrics and dispersed fibers between the polyurethane or polyisocyanurate foam and the facer.

The present invention is useful as a thermally insulating article.

DETAILED DESCRIPTION OF THE INVENTION

The present invention can be understood more readily by reference to the following detailed description, examples, and claims, and their previous and following description. However, it is to be understood that this invention is not limited to the specific compositions, systems, and/or methods disclosed unless otherwise specified, and as such, of course, can vary. While aspects of the present invention can be described and claimed in a particular statutory class, such as the composition of matter statutory class, this is for convenience only and one of skill in the art will understand that each aspect of the present invention can be described and claimed in any statutory class.

While the present invention is capable of being embodied in various forms, the description below of several embodiments is made with the understanding that the present disclosure is to be considered as an exemplification of the invention, and is not intended to limit the invention to the specific embodiments illustrated. Headings are provided for convenience only and are not to be construed to limit the invention in any manner. Embodiments illustrated under any heading or in any portion of the disclosure may be combined with embodiments illustrated under the same or any other heading or other portion of the disclosure.

Any combination of the elements described herein in all possible variations thereof is encompassed by the invention unless otherwise indicated herein or otherwise clearly contradicted by context.

All publications mentioned herein are incorporated herein by reference to disclose and describe the methods and/or materials in connection with which the publications are cited.

It is to be understood that the terminology used herein is for the purpose of describing particular aspects only and is not intended to be limiting. Unless defined otherwise, all technical and scientific terms used herein have the same meaning as commonly understood by one of ordinary skill in the art to which this invention belongs. In this specification and in the claims which follow, reference will be made to a number of terms which are defined herein.

As used in the specification and the appended claims, the singular forms "a," "an" and "the" include plural referents unless the context clearly dictates otherwise.

"Multiple" means two or more. "And/or" means "and, or as an alternative". When disclosing numerical values herein, for example, in disclosing values associated (in the alternative) with a property, such as molecular weight, etc., any of the disclosed numbers can be used singly to describe an open-ended range or in combination to describe a closed-ended range." All ranges include endpoints unless otherwise indicated.

Herein, references to "molecular weight" refer to weight average molecular weight, Mw, unless otherwise stated.

As used herein, the terms "optional" or "optionally" mean that the subsequently described event, condition, component, or circumstance may or may not occur, and that the description includes instances where said event, condition, component, or circumstance occurs and instances where it does not.

As used herein, the term "PUR" refers to a polyurethane polymer; the term "PIR" refers to a polyisocyanurate polymer; and the term "PUR/PIR" refers to a "polyurethane polymer or polyisocyanurate polymer".

The term "by weight," when used in conjunction with a component, unless specifically stated to the contrary, is based on the total weight of the formulation or composition in which the component is included. For example, if a particular element or component in a composition or article is said to be present in an amount of 8% by weight, it is understood that this percentage is in relation to a total compositional percentage of 100%. In some instances, the weight percent of a component is based on the total weight of the composition "on a dry basis" or "based on solids," which indicates the weight of the composition without water or solvents (e.g., less than about 1%, less than about 0.5%, less than about 0.1%, less than about 0.05%, or about 0% of water or solvents by weight, based on the total weight of the composition).

Test methods refer to the most recent test method as of the priority date of this document when a date is not indicated with the test method number. References to test methods contain both a reference to the testing society and the test method number. The following test method abbreviations and identifiers apply herein: ASTM refers to American Society for Testing and Materials; EN refers to European Norm; DIN refers to Deutsches Institut für Normung; and ISO refers to International Organization for Standards.

The flammability of foam laminates and other building materials can be assessed by the use of standardized testing protocols. The ASTM E-84 "Tunnel" test is a standard method for assessing the surface burning characteristics of building products by observing the flame spread along a sample surface. The burning behavior of this sample is then characterized relative to a red oak standard. The Flame Spread Index (FSI) and Smoke Development Index (SDI) are the parameters reported for a given sample, where FSI is a measurement of the speed at which flames progress across the interior surface of a building, while SDI quantifies the level of smoke generated by a sample as it burns. In ASTM E-84, the red oak calibration material is assigned FSI and SDI values of 100.

A reduction in the flammability allows the foam-foil laminates to achieve acceptable performance in larger scale fire tests such as ASTM E-84, where flame spread values of 25 or less are desired to be able to use the product as an insulation in exterior insulation applications, and are defined as "Class A" by International Building Code Section 803.1.2. In the same code, flame spread values of 26-75 are defined as "Class B", while flame spread values of 76-200 are defined to be "Class C".

The article of the present invention comprises a polyurethane (PUR) or polyisocyanurate (PIR) foam having a primary surface. Articles have at least one primary surface, and often, articles, such as boards, can have opposing primary surfaces. A "primary surface" is a surface of an article having a planar surface area equal to the greatest planar surface area of the surfaces of the article. A planar surface area is the surface area as projected onto a plane so as to neglect surface contours and roughness. An article can have a single primary surface. Articles such as boards, sheets and planks can have opposing primary surfaces. Cubes can have six primary surfaces. The PUR/PIR foam of the present invention has at least one primary surface and generally has two opposing primary surfaces.

In the broadest scope of the invention, any PUR/PIR foam is suitable for use in the present invention, including foam having an index of 1 or higher, 1.2 or higher, 5 or higher, 10 or higher, 50 or higher, or 100 or higher. However, it is desirable for the PUR/PIR foam to have an index of 200 or higher, preferably 250 or higher, more preferably 300 or higher, 350 or higher, even 400 or higher and at the same time is desirably 650 or lower, and can be 550 or lower, 500 or lower, and even 450 or lower. In an embodiment, the PUR/PIR foam has an index of from 200 to 650; such as, for example, from 300 to 600. Index is a measure of the molar ratio of isocyanate component functionality to polyol component functionality (hydroxyl functionality). Increasing PUR/PIR foam index results in a stiffer foam. Higher index is desirable to maintain integrity of foam char in a fire condition. It is easiest to determine Index of a PUR/PIR foam from the starting materials used to make the foam. Nuclear magnetic resonance spectroscopy of the isocyanate and polyol components can reveal the molar amounts of functionalities for each in order to calculate the index of the resulting foam.

Desirably, the PUR/PIR foam comprises reacted polyester polyol, particularly aromatic polyester polyol, as the primary (highest molar amount) polyol reactant in the foam. Other polyols that may be employed in forming the PUR/PIR polymers include polyether polyols, polycarbonate polyols, and others as known in the art. The primary polyol can be determined from the starting materials used to make the PUR/PIR foam.

The PUR/PIR foam of this invention is free of n-propyl bromide (nPB), which is a common blowing agent used in preparing flame retardant PUR/PIR foam. Desirably, the PUR/PIR foam is free of all brominated blowing agents that can introduce bromine into the released hydrocarbon blowing agent. Desirably, the PUR/PIR foam is free of all halogenated blowing agents. Even more desirably, the PUR/PIR foam is free of any halogens and any halogenated components.

The PUR/PIR foam can, and desirably does, comprise fibers embedded in certain locations in the foam or dispersed throughout the foam. The fibers can be inorganic fibers such as glass fibers. The fibers serve to provide structural integrity to the PUR/PIR foam, particularly if it chars.

The article of the present invention further comprises an aluminum facer covering and attached to the primary surface of the polyurethane or polyisocyanurate foam. The aluminum facer has a thickness of 0.02 millimeters (0.8 mils) or more, preferably 0.023 millimeters (0.9 mils) or more, and can be 0.0254 millimeters (1.0 mils) or more, 0.03 millimeters (1.2 mils) or more, 0.038 millimeters (1.5 mils) or more, 0.051 millimeters (2 mils) or more, 0.076 millimeters (3 mils) or more, 0.102 millimeters (4 mils) or more, 0.127 millimeters (5 mils) or more, 0.254 millimeters (10 mils) or more and at the same time is generally 3 millimeters or less in thickness. In an embodiment, the aluminum foil facer has a thickness of from 0.02 to 0.254 mm; such as, for example, from 0.023 to 0.127 mm.

Between the aluminum facer and PUR/PIR foam is a primer layer that is attached to both the aluminum facer and the PUR/PIR foam. The primer layer comprises, and can consist of, a primer component and a brominated component. The primer component and brominated component can be the same component or they can be separate components.

For example, the primer layer can comprise a single component that serves the role of both the primer component and the brominated component. The primer layer can also, or alternatively, comprise a primer that is not brominated in combination with a brominated component that may or may not act as a primer component. Desirably, the primer component and the brominated component are the same component.

The primer component acts as an interfacial binder that binds both to the aluminum facer and the PUR/PIR foam. The primer component results in stronger adhesion between the PUR/PIR foam and aluminum facer than adhesion between the aluminum facer and PUR/PIR foam in an absence of primer component therebetween.

The brominated component provides bromine radicals that are released at temperatures achieved when the primer layer is heated to temperatures that can typically be reached in fire conditions. Desirably, the brominated component is thermally stable at 180 degrees Celsius (° C.) and even at 200° C. where "stable" means the material has a 5 percent weight loss temperature at or above the specified temperature. A 5 percent weight loss temperature is the temperature at which 5 wt % of the composition is lost as it is heated at a temperature increase rate of 10° C./min, and is determined by thermogravimetric analysis using a nitrogen atmosphere.

Desirably, the brominated component comprises enough bromine and is present at a high enough concentration so as to establish a concentration of bromine in the primer layer that is 30 weight-percent (wt %) or more, preferably 35 wt % or more, more preferably 40 wt % or more, and can be 45 wt % or more and even 50 wt % or more, while at the same time is generally 70 wt % or less, where wt % bromine is the weight of bromine as a percentage of the combined weight of solids of the primer component and brominated component. In an embodiment, the concentration of bromine in the primer layer is from 30 wt % to 70 wt %; such as, for example, from 40 wt % to 70 wt % relative to the combined weight of solids of the primer component and the brominated component. The wt % bromine in the primer layer can be determined based on the composition of the components applied to the aluminum facer that will remain on the aluminum facer as the primer layer (that is, the material applied less any volatile solvent or carrier such as water).

When the concentration of bromine in the primer layer is 30 wt % or more, then the gas in bubbles (blisters) formed between the PUR/PIR foam and aluminum facer when the article of the present invention is exposed to heat is likely to contain as much bromine as when similar bubbles are formed under similar conditions in THERMAX™ brand insulation prepared using nPB blowing agent (THERMAX is a trademark of The Dow Chemical Company, Midland, Mich., USA). Hence, the use of the present bromine containing primer layer disclosed herein more efficiently locates the bromine where it is needed to provide bromine radicals in the bubble of gas formed between the PUR/PIR foam and aluminum facer when heated.

The most desirable examples of a material that can serve as both the primer component and the brominated component are linear brominated epoxy resins (BER). Nonetheless, any composition that contains bromine, adheres to aluminum, and has hydroxyl or other reactive groups, such as epoxy, amino, or carboxylic acid moieties, capable of reacting with and thereby bonding to the PUR/PIR foam can also be a suitable primer for this invention. Desirably, the concentration of bromine is high enough to produce a hydrocarbon:bromine molar concentration in the blister gas that is in the desirable range taught herein.

Desirably, the primer layer comprises or consists of linear BER. The primer layer can comprise or consist of one type of BER or a blend of two or more than two BERs. Preferably, linear BERs in the primer layer are based on (that is, made from and therefore contains polymerized units reacted therein) tetrabromobisphenol A. In certain embodiments, BERs may have a weight-average molecular weight of 700 or more, or 1000 or more, preferably 1500 or more, 1600 or more, 1800 or more, 2000 or more, 2500 or more, 5000 or more, 7500 or more, 10,000 or more, 15,000 or more, 20,000 or more, and even 21,000 or more, while at the same time typically have a weight-average molecular weight of 50,000 or less, and can have a weight-average molecular weight of 40,000 or less, 30,000 or less, 20,000 or less, 15,000 or less, 10,000 or less, 7000 or less. In an embodiment, the brominated epoxy resin has a weight average molecular weight of from 700 to 100,000 or 1,000 to 100,000; such as, for example, from 10,000 to 40,000. Weight-average molecular weights are in units of grams per mole. The weight-average molecular weight can be determined by gel permeation chromatography relative to polystyrene standards according to ASTM D5296.

Desirable BERs contain 40 wt % or more bromine, or 45 wt % or more bromine, preferably 50 wt % or more bromine, more preferably 53 wt % or more bromine, and at the same time typically contain 75 wt % or less bromine, or even 70 wt % or less, 65 wt % or less bromine, 60 wt % or less bromine, or 55 wt % or less bromine based on linear BER weight. In an embodiment, the brominated epoxy resin contains from 40 to 75 wt %; such as, for example, from 45 to 70 wt % of bromine. Wt % bromine in the BER can be calculated from the molecular composition of the BER. If molecular composition is unknown, then bromine composition can be determined using x-ray fluorescence. The BER can be made, for example, by the method of U.S. Pat. No. 4,684,701.

Examples of suitable primer materials that are not brominated components (that is, non-brominated primer components) include thermoset aromatic epoxy resins such as bisphenol A based epoxy resins and phenolic and cresol based novolac resins, styrenic-acrylic copolymers and acrylonitrile-based acrylic polymers.

Examples of suitable brominated components that can be combined with non-brominated primer components (or with BER) include brominated styrene/butadiene copolymers such as those available under the tradename Emerald Innovation™ 3000 (Emerald Innovation is a trademark of Chemtura Corporation, Philadelphia, Pa., USA) and FR-122 (ICL Industrial Products, Tel Aviv, Israel). Other suitable components in the primer layer can include tribromoneopentyl alcohol, dibromoneopentyl glycol tris-(tribromoneopentyl) phosphate ester, triphenyl phosphate, triethyl phosphate, 1,2-(triethyl phosphate ester) of ethylene glycol (Fyrol PNX), tetrabromobisphenol A, tris-(dichloropropyl)-phosphate ester, di-(diphenyl phosphate)-resorcinol, brominated versions of phenyl glycidyl ether such has glycidyl ether of 2, 4, 6-tribromophenyl, brominated polybutadiene rubber, tetrabromophthalate ester diol (PHT-4a diol), bis-(1, 2-dibromopropyl ether) of tetrabromobisphenol A, and brominated polystyrene, such as that sold under the trade name SAYTEX™ HP-3010 (SAYTEX is a trademark of Albemarle Corporation, Charlotte, N.C., USA).

In certain embodiments, the primer layer is free of chlorine and chlorinated components. Desirably, the primer layer is free of any halogenated components other than the brominated component. Chlorine and chlorinated components are particularly undesirable because chlorine causes corrosion of the aluminum facer.

Desirably, the primer layer has a glass transition temperature higher than 70 degrees Celsius (° C.), and preferably 100° C. or higher, so that the aluminum facer coated with the primer layer can be rolled up (optionally, still warm) without having the primer layer stick the aluminum facer to itself. In an embodiment, the primer layer has a glass transition temperature of from 70° C. to 200° C.; such as, for example, from 100° C. to 180° C. The glass transition temperature for the primer layer can be determined using differential scanning calorimetry with a sample weight of 10 milligrams in an open aluminum DSC pan, with an oven ramped from 25° C. to 200° C. at 10° C. per minute for two scans with the glass transition temperature being the mid-point temperature between the beginning and end of the detected phase transition of the second scan. If multiple glass transition temperatures are evident (for example, when the primer layer comprises multiple components), then the lowest glass transition temperature is considered the glass transition temperature for the primer layer.

The brominated component is generally present in the primer layer at a level so as to achieve an average bromine concentration of 1.0 grams per square meter ($g/m^2$) or more, preferably 1.2 $g/m^2$ or more; or 1.5 $g/m^2$ or more, more preferably 1.6 $g/m^2$ or more and can be 2.0 $g/m^2$ or more, 2.5 $g/m^2$ or more, 3.0 $g/m^2$ or more, 3.5 $g/m^2$ or more, 4.0 $g/m^2$ or more, 4.5 $g/m^2$ or more, 5.0 $g/m^2$ or more, 5.5 $g/m^2$ or more, 6.0 $g/m^2$ or more, 6.5 $g/m^2$ or more, 7.0 $g/m^2$ or more, and even 10.0 $g/m^2$ or more, 15.0 $g/m^2$ or more, 19.0 $g/m^2$ or more with the Br concentration based on surface area of the aluminum facer attached to the PUR/PIR foam. There is no known technical upper limit to the average concentration of bromine, but the concentration is generally 20.0 $g/m^2$ or less. In an embodiment, the brominated component is present at an average bromine concentration of from 1.2 to 20.0 $g/m^2$; such as, for example, from 1.5 to 20.0 $g/m^2$. The average concentration of bromine (in $g/m^2$) can be determined by multiplying the mass of solids of the primer layer coated on the aluminum facer (in g) by the bromine concentration of the primer layer coating (% bromine in the primer layer) and then dividing by the surface area of the aluminum facer coated (in $m^2$).

There is an absence of fibers in the form of fiber mats, fiber fabrics (including woven and non-woven articles) and dispersed fibers between the PUR/PIR foam and the aluminum facer. Preferably, there is an absence of fibers of any kind between the PUR/PIR foam and aluminum facer. The PUR/PIR foam can and desirably does comprise fibers such as glass fibers embedded or dispersed therein. As a result, fibers can extend out from the PUR/PIR foam and partially reside on the surface of the PUR/PIR foam. Fibers embedded in the PUR/PIR foam are not considered to be between the foam and aluminum facer, even if they partially or entirely reside on the surface of the PUR/PIR foam. Herein, fibers that reside between the PUR/PIR foam and aluminum facer are entirely external to both the PUR/PIR foam and aluminum facer.

The primer layer, and desirably, the entire article, can be free of any one or any combination of more than one of the following materials: halogenated paraffin, metal oxides of the arsenic group (such as, for example, antimony oxide and arsenic oxide), halogenated plasticizers, and polyvinyl acetate.

It is typical to make the articles of the present invention by first coating one surface of the aluminum facer with the primer layer and then coating the primer layer with a PUR/PIR foam formulation that expands into a PUR/PIR foam while concomitantly bonding to the primer layer. The primer layer bonds to the aluminum facer when it is coated onto the aluminum facer. The PUR/PIR foam bonds to the primer layer when the PUR/PIR foam formulation is coated over the primer layer. Typically, the isocyanate component in the PUR/PIR foam formulation bonds with hydroxyl or other reactive groups in the primer layer to achieve bonding between the PUR/PIR foam and the primer layer.

The primer layer can be applied to the aluminum facer by a variety of different techniques. It can be applied as a neat composition of the primer and brominated components, which, optionally, may have been heated to melt them so they can be applied by a liquid coating process. Similarly, it can be applied as a solid, powdered mixture of the primer and brominated components, which, optionally, may then be heated to melt and adhere to the aluminum foil as a uniform coating. It can also be applied as a fluid, where the primer and brominated components have been dissolved in a common solvent, which is then evaporated to form the desired uniform coating on the aluminum foil. Alternatively, the primer layer can be applied to the aluminum facer as a dispersion, where small particles comprised of primer and/or brominated components are suspended in an appropriate fluid, preferably water. It is also permissible to have a dispersion where one component, either the primer or the brominated component, is soluble in the fluid medium, while the other is insoluble, forming a dispersion of solid particles.

In these primer dispersions, the particles can form a dispersion in the fluid medium with the primer or brominated component(s) in the solid state via an appropriate grinding process or in the liquid state by a shearing process to disperse and then stabilize the particles. Alternately, the dispersion can be formed by mixing a powder of the primer or brominated component(s) into the desired fluid medium. Often, it is useful to add small quantities of surfactants to the fluid medium to help stabilize the dispersion. The mean particle size of the dispersion is generally 30 microns or below, preferably 20 microns or below, more preferably 10 microns or below, and most preferably 1 micron or below.

Using an aqueous dispersion is desirable for BERs that have a high enough molecular weight or viscosity that they are difficult to soften into a flowable phase that can be coated over an aluminum facer. BERs can be dispersed in an aqueous medium using mechanical dispersion technology and then the dispersion can be coated over an aluminum facer and the aqueous component evaporated off. Desirably, organic solvents are not used when applying the primer layer to an aluminum facer. If solvents are necessary, it is desirable that they be selected from those that are not listed on the EPA Hazardous Atmospheric Pollutants list. Examples of useful solvents include ethyl acetate, n-butyl acetate, methyl ethyl ketone, toluene, and xylene.

When the primer layer is coated from a solution or dispersion of the primer and brominated components, it is often desirable to subject the coated foil to an elevated temperature for a time sufficient to evaporate the solvent or dispersion medium and, optionally (if necessary), melt or consolidate the deposited particles into a consistent film. The temperatures used should be above the normal boiling points of the water or organic solvents used to form the solution or dispersion, but below the temperature where decomposition of the primer or brominated components is initiated.

Clauses

Certain embodiments of the invention are disclosed in the following clauses. Embodiments disclosed in any of the clauses may be combined with embodiments disclosed in any other clause(s). Further, one or more elements disclosed in one embodiment in any of the clauses may be combined with elements disclosed in any other embodiments disclosed in any other clause(s).

Clause 1A: An article comprising a polyurethane or polyisocyanurate foam having a primary surface, an aluminum facer covering, and a primer layer between and attached to the primary surface of the foam and the aluminum facer; wherein the article is characterized by: (a) the primer layer having a concentration of bromine in said primer layer, comprising a primer component and a brominated component, where the primer component and brominated component are the same or different components; (b) the primer layer is free of chlorinated components; and (c) an absence of fibers in the form of fiber mats, fiber fabrics and dispersed fibers between the polyurethane or polyisocyanurate foam and the facer.

Clause 1B: An article comprising a polyisocyanurate foam having a primary surface, an aluminum facer covering, and a primer layer between and attached to the primary surface of the foam and the aluminum facer; wherein the article is characterized by: (a) the primer layer having a concentration of bromine in said primer layer, comprising a primer component and a brominated component, where the primer component and brominated component are the same or different components; (b) the primer layer is free of chlorinated components; and (c) an absence of fibers in the form of fiber mats, fiber fabrics and dispersed fibers between the polyisocyanurate foam and the facer.

Clause 2: The article of Clause 1A or 1B, wherein the concentration of bromine in the primer layer is greater than 30 weight-percent relative to the combined weight of solids of the primer component and the brominated component. In an embodiment, the concentration of bromine in the primer layer is from 30 wt % to 80 wt %; or from 30 wt % to 70 wt %; or from 30 wt % to 60 wt %; or from 30 wt % to 50 wt %; or from 30 wt % to 40 wt % relative to the combined weight of solids of the primer component and the brominated component.

Clause 3: The article of Clause 1A or 1B, wherein the concentration of bromine in the primer layer is 40 weight-percent or more relative to the combined weight of solids of the primer component and the brominated component. In an embodiment, the concentration of bromine in the primer layer is from 40 wt % to 80 wt %; or from 40 wt % to 70 wt %; or from 40 wt % to 60 wt %; or from 40 wt % to 50 wt % relative to the combined weight of solids of the primer component and the brominated component.

Clause 4: The article of Clause 1A or 1B, wherein the concentration of bromine in the primer layer is 50 weight-percent or more relative to the combined weight of solids of the primer component and the brominated component. In an embodiment, the concentration of bromine in the primer layer is from 50 wt % to 80 wt %; or from 50 wt % to 70 wt %; or from 50 wt % to 60 wt % relative to the combined weight of solids of the primer component and the brominated component.

Clause 5: The article of any one previous Clause, wherein the brominated component is a brominated epoxy resin. In an embodiment, the brominated epoxy resin contains 40 wt % or more of bromine; such as, for example, from 40 to 75 wt %; or from 40 to 70 wt %; or from 40 to 65 wt %; or from 40 to 60 wt %; or from 45 to 75 wt %; or from 45 to 70 wt %; or from 45 to 65 wt %; or from 45 to 60 wt %; or from 50 to 75 wt %; or from 50 to 70 wt %; or from 50 to 65 wt %; or from 50 to 60 wt % of bromine.

Clause 6: The article of Clause 5, wherein the brominated epoxy resin has a weight average molecular weight that is 700 or more and 100,000 or less. In an embodiment, the brominated epoxy resin has a weight average molecular weight of from 700 to 50,000; or from 1,000 to 50,000; or from 10,000 to 50,000; or from 10,000 to 40,000; or from 10,000 to 30,000; or from 15,000 to 30,000; or from 15,000 to 25,000.

Clause 7: The article of any one previous Clause, wherein the primer component and the brominated component are the same.

Clause 8: The article of any one of Clauses 1A, 1B, or 2-4, wherein the brominated component is a brominated styrene-butadiene copolymer. In an embodiment, the brominated styrene-butadiene copolymer has a weight average molecular weight of from 10,000 to 1,000,000; or from 10,000 to 500,000; or from 10,000 to 250,000; or from 10,000 to 200,000; or from 20,000 to 250,000; or from 50,000 to 250,000; or from 50,000 to 200,000; or from 75,000 to 150,000.

Clause 9: The article of any one previous Clause, wherein the primer layer has a glass transition temperature of 70 degrees Celsius or higher. In an embodiment, the primer layer has a glass transition temperature of from 70° C. to 200° C.; or from 70° C. to 180° C.; or from 70° C. to 150° C.; or from 80° C. to 200° C.; or from 80° C. to 180° C.; or from 80° C. to 150° C.; or from 90° C. to 200° C.; or from 90° C. to 180° C.; or from 90° C. to 150° C.; or from 100° C. to 200° C.; or from 100° C. to 180° C.; or from 100° C. to 150° C.; or from 110° C. to 200° C.; or from 110° C. to 180° C.; or from 110° C. to 150° C.; or from 120° C. to 200° C.; or from 120° C. to 180° C.; or from 120° C. to 150° C.

Clause 10: The article of any one previous Clause, wherein the primer layer is free of halogenated components other than the brominated component.

Clause 11: The article of any one previous Clause, wherein the primer layer is free of halogenated paraffin, a metal oxide of the arsenic group and polyvinyl acetate.

Clause 12: The article of any one previous Clause, wherein the polyurethane or polyisocyanurate foam is free of halogenated blowing agents.

Clause 13: The article of any one previous Clause, wherein the polyurethane or polyisocyanurate foam is free of n-propyl bromide.

Clause 14: The article of any one previous Clause, wherein the polyurethane or polyisocyanurate foam is a rigid foam having an index of 200 or greater. In an embodiment, the polyurethane or polyisocyanurate foam has an index of from 200 to 650; or from 200 to 550; or from 200 to 400; or from 300 to 650; or from 300 to 550; or from 300 to 400; or from 400 to 650; or from 400 to 550.

Clause 15: The article of any one previous Clause, wherein the polyurethane or polyisocyanurate foam is a polyisocyanurate foam.

Clause 16: The article of any one previous Clause, wherein the aluminum foil facer has a thickness of 0.02 millimeters or greater. In an embodiment, the aluminum foil facer has a thickness of from 0.02 to 0.254 mm; or from 0.02 to 0.127 mm; or from 0.023 to 0.254 mm; or from 0.023 to 0.127 mm.

Clause 17: The article of any one previous Clause, wherein the brominated component is present at an average bromine concentration of 1.0 $g/m^2$ or more; such as, for example, from 1.0 to 20.0 $g/m^2$; or 1.2 to 20.0 $g/m^2$; or 1.2 to 15.0 $g/m^2$; or from 1.5 to 20.0 $g/m^2$; or 1.5 to 15.0 $g/m^2$; or from 1.6 to 20.0 $g/m^2$; or 1.6 to 15.0 $g/m^2$; or from 2.0 to 20.0 $g/m^2$; or 2.0 to 15.0 $g/m^2$; or 2.0 to 10.0 $g/m^2$.

The present invention is further defined in the following Examples, in which all parts and percentages are by weight, unless otherwise stated. It should be understood that these examples, while indicating preferred embodiments of the invention, are given by way of illustration only and are not to be construed as limiting in any manner. From the above discussion and these examples, one skilled in the art can ascertain the essential characteristics of this invention, and without departing from the spirit and scope thereof, can make various changes and modifications of the invention to adapt it to various usages and conditions.

EXAMPLES

Lab Scale Article Preparation

Lab scale Example articles that demonstrate this invention were prepared in the following manner. A sheet of aluminum facer (22.86 micron (0.9 mil) thick, available from Hanover Foils LLC, Ashland, Va., USA, as product ID C504W) was coated with a primer layer and 0.41 meter by 0.41 meter (16 inch by 16 inch) square pieces of primer-coated aluminum facer were cut from the sheet. The primer composition and thickness was varied in each Example as described below. The foil square was placed on a flat surface with the primer coated side facing up. A 0.38 meter by 0.38 meter (15 inch by 15 inch) block was placed centrally on the piece of aluminum facer and 1.27 centimeter edges of the aluminum facer were folded up all the way around the block in order to create a "dish" with a 0.38 meter by 0.38 meter square bottom and 1.27 centimeter walls out of the facer such that the primer layer was on the inside surface of the "dish". The facer "dish" was placed into a box having 0.38 meter by 0.38 meter inside dimensions so that the sides of the box supported the walls of the aluminum facer "dish".

A PIR foam formulation was prepared by combining the A-Side and B-side components of the formulation (described below) together in a plastic tube and mixing for 15 seconds to create a mixture. The catalyst was added to the mixture and mixed for an additional 5 seconds to obtain the PIR foam formulation.

The PIR foam formulation was poured into the dish described above and allowed to cure into a PIR foam to form a laminated article. The resulting laminated article had a thickness of approximately 20 centimeters. The laminated article was aged for seven days. A portion of the laminated article was cut, 2.5 centimeters thick as measured from the aluminum foil facer at the center of the article. (The laminated article tends to be thicker at its edges because the surface of the article with the aluminum foil facer tends to rise slightly from the bottom of the box as the PIR foam cures, thereby creating a concave surface with the aluminum foil facer; edges can be as much as 3.8 centimeters thick when the center is 2.5 centimeters thick). The cut portion was subjected to blistering and the blister gas was analyzed immediately, as described below.

Blister Test and Cell Gas Analysis

The following procedure was used to cause blistering of the facer on the example articles. An aluminum foil faced foam laminate article was secured in place horizontally over a Fisher Burner (Model 3-900, flame opening of 3.8 centimeters (1.5 inches) outside diameter and a metal grating having 3.175 millimeters (⅛ inch) openings) with the uncoated aluminum surface of the article directed down over the Fisher Burner. The distance between the top of the burner and the aluminum facer of the article was 26.67 centimeters (10.5 inches).

The burner was moved out from under the article and was lit with the air wing wide open, the gas needle valve open one complete revolution, and the gas flow valve was adjusted such that 8-12 spikes of blue flames were observed on the surface of the burner.

The lit burner was then positioned directly under the center of the suspended article and the aluminum facer was exposed to the flame for 90 seconds while observing the area of the article directly above the flame. After 90 seconds, the gas flow to the burner was shut off. During the flame exposure, a blister formed under the aluminum facer that grew to a final diameter of approximately 20-25 centimeters (8-10 inches). Immediately after shutting off the burner, the gas inside the blister was sampled by inserting a syringe needle attached to a pre-weighed 10 milliliter gas-tight glass syringe through the foam side of the article and approximately 5 milliliters of cell gas was withdrawn from the bubble volume comprising the blister.

5 milliliters of toluene was added to the syringe containing the blister gas. The syringe and its contents were weighed on an analytical balance. The syringe and its contents were shaken vigorously to mix the blister gas and toluene.

(a) Bromine Concentration by Neutron Activation Analysis

The concentration of bromine in the blister gas sample may be determined by neutron activation analysis. Neutron activation analysis was conducted by transferring approximately 0.1 grams of the blister gas/toluene sample (see above) into a pre-cleaned 2-gram polyethylene vial. Standards of varying bromine concentration were prepared by transferring appropriate amounts of the National Institute for Standards and Technology (NIST) certified standard solutions into similar vials. The standards were diluted to the same volume as the experimental sample using methanol. Additionally, a blank sample was prepared containing pure methanol. The vials were heat sealed. The sample, standards, and blank were analyzed for bromine content using a Mark I TRIGA™ nuclear reactor (TRIGA is a trademark of General Atomics Corporation, San Diego, Calif., USA). The samples were irradiated for 10 minutes at 30 kiloWatts of reactor power in a rotary specimen rack. After 10 minutes, gamma spectroscopy was conducted for 4000 seconds each. The bromine concentrations were calculated from the spectra using Canberra™ software (Canberra is a trademark of Mirion Technologies, San Ramon, Calif., USA) and standard comparative techniques. The results show uncertainty of less than 5% relative to the values.

Integrated Hydrocarbon Area by GC/MS

A portion of the blister gas/toluene mixture was eluted into 20 milliliter scintillation vials. Aliquots of the toluene/gas mixture were placed in gas chromatograph/liquid chromatograph (GC/LC) vials and analyzed by gas chromatography/mass spectrometry (GC/mass spec). Integrated peak areas for the three blowing agents (isopentane, n-pentane and cyclopentane) were measured and summed to provide an Integrated Hydrocarbon Area. Identification of retention times for the blowing agents were determined by running pure samples of each type of blowing agent through the GC/MS.

The GC/mass spec conditions were as follows. Instrument: Agilent 7890B GC coupled with a 5977A mass spectrometer detector. Software: MassHunter. Column: 30 meter×0.25 millimeter internal diameter by 1.00 micron film; Agilent J&W DB-5MS. Column temperature profile: 40° C., hold 3 minutes, ramp to 250° C. at 8° C. per minute, hold at 250° C. for three minutes. Source temperature: 250° C. Quad: 150° C. Gas Flow: 1.6 milliliters per minute constant flow of helium to three-way splitter. Restrictor #1: 1.0 milliliters per minute MSD. Restrictor #2: 1.2 milliliters per minute to FID. Split Ratio: 100/1. Injection volume: one microliter. Detector: electron multiplier 1213V. Source: EI. Fixed Electron Energy: 70.0 electron volts. Scan: 18 to 550 amu (EI). Rate: 2.8 scans per second. Gain: 1.000. Solvent delay: 1.00 minutes. Total run time: 32.25 minutes.

(b) Relative Hydrocarbon/Bromine Concentration in Blister Gas

A relative hydrocarbon to bromine concentration in the blister gas was determined by dividing the Integrated Hydrocarbon Area by the bromine concentration for each sample. Lower values for this ratio are desirable, since lower values indicate a less flammable gas composition due to more bromine relative to flammable hydrocarbons.

Comparative and Inventive Samples

Comparative Example A: Standard nPB-Containing Article

Three reference standards were prepared using a conventional foam comprising nPB blowing agent using the Lab Scale Article Preparation procedure described above and employing the PIR foam formulation for Comp Ex A in Table 2 deposited on the styrene-acrylate coated aluminum facer. There was no brominated component in the primer layer for this Comparative Example.

Results from analysis of the cell gas from the Blister Test and Cell Gas Analysis for the three Comp Ex A samples are in Table 3.

Comparative Example B: nPB-Free PIR without Bromine in Primer Layer

The Comp Ex B sample was prepared using the Lab Scale Article Preparation procedure described above and using the PIR foam formulation for Comp Ex B in Table 2 deposited on the styrene-acrylate coated aluminum facer. There was no brominated component in the primer layer for this Comparative Example.

Results from analysis of the cell gas from the Blister Test and Cell Gas Analysis for the Comp Ex B sample are in Table 3.

Examples 1a, 1b and 1c: Brominated Epoxy Resin Primer with nPB-Free PIR

Examples 1a through 1c are all nPB-free PIR foam articles that use brominated epoxy resin (BER) as both the primer component and brominated component of the primer layer. The three Example (Ex) 1 samples contained three different loadings of BER on the aluminum foil demonstrating the generation of different blister gas bromine levels at three different loadings of BER as the primer layer. The BER polymer contains 52.0 wt % bromine.

Example (Ex) 1 samples were prepared using the Lab Scale Article Preparation procedure described above and using the PIR foam formulation for Ex 1 in Table 2 deposited on the primer-coated aluminum facer. For the Ex 1 samples, the primer-coated aluminum facer was prepared by spreading a 10 wt % solution of a brominated epoxy resin in 1,2-dichloroethane onto the inside surface of the aluminum facer "dish" and evaporating the dichloroethane solvent. The amount of 10 wt % solution applied was calculated so as to achieve, upon drying, a uniform concentration of bromine loading over the surface of the aluminum facer "dish" that is 1.6 g/m² (0.15 g/ft²) for Ex 1a, 3.3 g/m² (0.31 g/ft²) for Ex 1b and 6.6 g/m² (0.61 g/ft²) for Ex 1c. [For example, for Ex 1a: 4.44 g of 10% solution of BER contains 0.444 g of BER solids. BER is 52% Br by solids, so 0.444 g of BER contains 0.444×0.52=0.231 g Br. The box is 0.38 m×0.38 m in base surface area=0.1444 m² area. So, 0.231 g of Br covering 0.1444 m² area is equivalent to 0.231 g/0.1444 m²=1.6 g/m² Br loading in the primer layer].

After 24 hrs, the PIR foam formulation was poured onto the lab applied primer layer.

The BER has the molecular formula $C_3H_5O$ $(C_{18}H_{16}O_3Br_4)nC_{18}H_{15}Br_4O_2$ (CAS Number 68928-70-1) having a 52.0 wt % bromine content, a molecular weight of 20,000, a Tg of 140-150° C., and a 5 percent weight loss temperature of 357° C. (This BER is commercially available as F-2100 from ICL Industrial Products (Tel Aviv, Israel).

Results from analysis of the cell gas from the Blister Test and Cell Gas Analysis for Ex 1a through 1c samples are summarized in Table 3.

Examples 2a, 2b, 2c and 2d:
Polyacrylate/Brominated Polymer Primer with nPB-Free PIR Examples 2a through 2d are all nPB-free PIR foam articles that use a combination of a polyacrylate resin as a primer component and a brominated polymer (brominated styrene-butadiene copolymer, 65 wt % bromine) as a brominated component in the primer layer applied to the aluminum foil.

The Ex 2 samples were prepared using the Lab Scale Article Preparation procedure described above and using the PIR foam formulation for Ex 2 in Table 2 deposited on the primer-coated aluminum facer. For the Ex 2 samples, the primer-coated aluminum facer was prepared by spreading a 17 wt % solution that is a 50/50 weight % blend based on solids of the brominated polymer dissolved in toluene at 10 wt % and a Paraloid AU-608X polyacrylate resin composition containing 2-hydroxyethylacrylate having a solids content of 58 wt % in xylene onto the inside surface of an aluminum facer "dish". The amount of 17 wt % solution applied was calculated so as to achieve, upon drying, a bromine concentration of 1.7 g/m² (0.16 g/ft²) for Ex 2a, 3.4 g/m² (0.32 g/ft²) for Ex 2b, 5.2 g/m² (0.48 g/ft²) for Ex 2c, and 10.2 g/m² (0.95 g/ft²) for Ex 2d. After drying the coated Al "dishes" for 24 hrs, the PIR foam formulation was poured onto the lab applied primer layer.

The brominated polymer is a brominated styrene-butadiene copolymer (CAS Number 1195978-93-8) having a molecular formula of: $(C_8H_8)_x[(C_4H_6Br_2)y(C_4H_6Br_2)_z]$ $(C_8H_8)_x$, with a bromine content of 65 wt %, and a weight average molecular weight of 100,000 (and Tg approximately 130° C.). This brominated polymer is commercially available as FR-122P from ICL Industrial Products (Tel Aviv, Israel).

The total amount of bromine in the resulting primer layer was 32.5 wt % based on the primer layer weight. Primer layer weight refers to the solids weight of the primer layer.

Results from the analysis of the cell gas from the Blister Test and Cell Gas Analysis for Ex 2a through 2d samples are summarized in Table 3.

Examples 3a, 3b, 3c and 3d: Proprietary Brominated Primer with nPB-Free PIR

Examples 3a and 3b are both nPB-free laminated PIR foam articles where a proprietary primer composition, PMR-17628S, obtained from Selective Coatings & Inks, Inc. (Farmingdale, N.J., USA), has been applied to the aluminum foil. This primer coating comprised a suspension of a ground, brominated material in a solution of a primer resin dissolved in methyl ethyl ketone (that is, 2 components plus solvent), and was specified to contain 54% by weight solids, with a bromine content of 60% after drying.

The Ex 3 samples were prepared using the Lab Scale Article Preparation procedure described above, using the same PIR foam formulation used for Ex 1 and Ex 2 in Table 2 deposited on the primer-coated aluminum facer. For the Ex 3a and Ex 3 b samples, 1.64 g of primer composition PMR-176285 (54 wt % solids) was diluted to 10 grams using methyl ethyl ketone, and this approximately 10 wt % solids suspension was spread on the inside surface of an aluminum facer "dish" to apply the primer coating. The loading of bromine for Ex 3a and 3b, was 3.7 g/m² (0.34 g/ft²). [1.64 g of 54% solids suspension of primer is 1.64×0.54=0.886 g solids of primer. Primer is 60% Br by weight of solids, so 0.886×0.60=0.531 g Br solids. Primer is spread over 0.38 m×0.38 m=0.1444 m² area. 0.531 g Br solids spread over 0.1444 m² area is equivalent to 0.531 g/0.1444 m2=3.7 g/m²]

For Sample Ex 3c and Ex 3d, 2.18 g of PMR-176285 (54 wt % solids) was diluted to a total of 10 g with methyl ethyl ketone and this suspension was spread on the inside surface of an aluminum facer "dish" to apply the primer coating. The loading of bromine for Ex 3c and 3d was 5.0 g/m² (0.46 g/ft²).

Results from the analysis of the cell gas from the Blister Test and Cell Gas Analysis for Ex 3a though 3d samples are summarized in Table 3.

Table 1 identifies the materials used in preparing samples.

TABLE 1

Materials used in preparing samples.

| Component | Description | Source |
|---|---|---|
| PAPI 20 | Polymethylene polyphenylisocyanate having an isocyanate functionality of 3.3 and an isocyanate content of 35 wt %. | The Dow Chemical Company |
| Terate ™ HT5502 Terate is a trademark of Invista North America | Blend of aromatic polyester polyol and tris-(2-propanol, 1-chloro) phosphate having a hydroxyl number of 216, equivalent weight of 260, chlorine content of 2.4 wt % and phosphorous content of 0.70 wt %. | Invista North America |
| IP 9005 | Aromatic polyester polyol with a hydroxyl number of 315 and equivalent weight of 178. | The Dow Chemical Company |

TABLE 1-continued

Materials used in preparing samples.

| Component | Description | Source |
|---|---|---|
| Vorasurf™ 504 Vorasurf is a trademark of The Dow Chemical Company. | Polyethylene oxide-co-butylene oxide triblock organic surfactant with an equivalent weight of 3400 and a hydroxyl number of 16.5. | The Dow Chemical Company |
| Saytex™ RB7940 Saytex is a trademark of Albemarle Corporation | Blend of bromine containing diester/ether diol of tetrabromophthalic acid (CAS#77098-07-8) and tris-(2-chloroisopropyl)) phosphate (CAS#6145-73-9) having a Hydroxyl Number of 85, bromine content of 18.0 wt %, chlorine content of 20.0 wt % and phosphorous content of 5.6 wt % | Albemarle Corporation |
| Saytex RB9170 | A bromine containing diester/ether diol of tetrabromophthalic acid, CAS#77098-07-8 having a Hydroxyl Number of 170 and a bromine content of 43 wt %. | Albemarle Corporation |
| n-PB | N-propyl bromide (1-bromopropane). 65 wt % bromine. | Albemarle Corporation |
| Triethyl phosphate | 99% purity | Stem Chemical Inc. |
| SH 80/20 | Mixture of cyclopentane, isopentane and 2,3-dimethylbutane at a weight-ratio of 58/20/22 respectively | South Hampton |
| Pel-Cat 9887F | Blend of potassium based trimerization catalysts, 37 wt % active ingredients, hydroxyl number of 661. | Ele-Pelron |
| Paraloid™ AU-608X Paraloid is a trademark of Rohm and Haas Company | 20,000 molecular weight acrylic polymer containing butyl methacrylate and 2-hydroxyethyl acrylate, with a hydroxyl equivalent weight of 650, delivered as a 58 wt % solids solution in xylene. | Rohm and Haas Company. |
| PMR-17628 | Flame Retardant Primer having a dispersion of a proprietary solid brominated fire retardant and adhesive in methyl ethylketone having a wt % solids of 54% + 1 and wt % volatile organic. content of 45%. Bromine content is 60 wt % based on solids | Selective Coatings & Inks, Inc |
| 1, 2-Dichloroethane | CAS# 107-06-2, 99.8% Pure | Sigma-Aldrich |
| Methyl ethyl ketone | CAS# 79-93-3, 99.7% Pure | Fisher Scientific |
| Toluene | CAS# 108-88-3, Certified ACS grade | Fisher Scientific |

Table 2 shows the PIR Foam formulation used in Comparative Example A, and the PIR Foam formulation used in Comparative Example B, and Examples 1, 2 and 3.

TABLE 2

Components used in formulations to prepare polyisocyanurate foam boards.

| Comp Ex A | | Comp Ex B, Ex 1, Ex 2, and Ex 3 | |
|---|---|---|---|
| Component | Grams | Component | Grams |
| A-side | | A-side | |
| PAPI 20 | 813.8 | PAPI 20 | 906.2 |
| B-side | | B-side | |
| Terate HT5502 | 178.9 | Dow IP 9005 | 134.1 |
| Vorasurf 504 | 7.2 | Vorasurf 504 | 6.7 |
| Saytex RB7940 | 110.9 | Saytex RB9170 | 46.4 |
| n-PB | 27.0 | Triethyl phosphate | 44.3 |
| Water | 1.4 | Water | 3.4 |
| SH 80/20 | 81.3 | SH 80/20 | 73.1 |
| Catalyst | | Catalyst | |
| Pel-Cat 9887F | 29.0 | Pel-Cat 9887F | 33.4 |
| Formulation Index | | Formulation Index | |
| 425 | | 480 | |

The data in Table 3 reveals that selectively positioning bromine in the primer layer of the article of the present invention enables formation of blister gas with ratios of hydrocarbons to bromine that one would expect from conventional articles having higher total bromine contents in the articles. The total bromine content of the examples in Table 3 were determined by calculating the weight % bromine present in a 30.5 cm×30.5 cm×2.5 cm (12 in×12 in×1 in) volume of foam having a density of 32.4 kg/m$^3$ (2.01 bs/ft), prepared using the formulations shown in Table 2 with a facer laminated onto one face of foam. The amount of bromine present in the primer layer of the coated facer is added to the mass of bromine present within the foam. This assumes that there is no loss of any of the hydrocarbon blowing agents or carbon dioxide generated by the reaction of isocyanate groups with water.

For Comparative Example A, bromine content is derived only from the n-PB and the RB-7940 in the foam, since the primer layer is bromine free. Hence, the weight percent of bromine present was calculated by adding the weight of n-PB multiplied by its weight fraction of bromine to the weight of RB-7940 multiplied by its weight fraction of bromine to get the total weight of bromine present in the formulation. This value was then divided by the total weight of all the formulation components and multiplied by 100 to get the total bromine weight percent present in the formulation. In order to determine the mass of the desired 30.5 cm×30.5 cm×2.5 cm (12 in×12 in×1 in) volume of foam (equal to 2325.625 cm$^3$ (or 144 in$^3$)), we divide this value by the density of 0.032 g/cm³ to get the mass associated with this defined volume. The wt % bromine relative to total sample weight, as shown in Table 3 is then calculated as the mass of bromine divided by the mass of the defined volume of foam, multiplied by 100%. For Examples 1, 2 and 3, the mass of bromine associated with the primer layer coating load on a piece of foil having the same dimensions of 30.5 cm×30.5 cm is added to the mass of bromine associated with the foam formulation, and this total is divided by the total mass of the foam components to give the bromine weight percent listed in Table 3.

In particular, the hydrocarbon/bromine ratio in the resulting blister gas can be comparable to foam made with nPB and a much higher total loading of bromine throughout the PIR foam of the article. Hence, blister gas with lower flammability can be achieved with articles having lower overall bromine concentrations by preferentially locating the brominated materials in the primer layer.

TABLE 3

Bromine levels in the laminate article.

| Sample | Total Bromine Concentration in Article (wt % relative to total foam weight)* | Wt % Br in Primer Layer | Bromine Loading in Primer Layer (g/m²) | Ratio of hydrocarbons/ bromine in Blister Gas |
|---|---|---|---|---|
| Comp Ex A(1) | 3.0 | 0.0 | NA | 21,900 |
| Comp Ex A(2) | 3.0 | 0.0 | NA | 22,100 |
| Comp Ex A(3) | 3.0 | 0.0 | NA | 25,400 |
| Comp Ex B | 1.5 | 0.0 | NA | 271,400 |
| Ex 1a | 1.8 | 52.0 | 1.6 | 76,100 |
| Ex 1b | 1.9 | 52.0 | 3.3 | 44,700 |
| Ex 1c | 2.3 | 52.0 | 6.6 | 11,700 |
| Ex 2a | 1.7 | 32.5 | 1.7 | 32,900 |
| Ex 2b | 1.9 | 32.5 | 3.4 | 21,400 |
| Ex 2c | 2.1 | 32.5 | 5.2 | 19,100 |
| Ex 2d | 2.7 | 32.5 | 10.2 | 9,700 |
| Ex 3a | 1.9 | 60.0 | 3.7 | 16,200 |
| Ex 3b | 1.9 | 60.0 | 3.7 | 17,100 |
| Ex 3c | 2.1 | 60.0 | 5.0 | 8,200 |
| Ex 3d | 2.1 | 60.0 | 5.0 | 11,200 |

*Assumes a uniform foam density of 0.032 g/cm³ and uniform foam thickness of 2.5 centimeters.

The high ratio of the hydrocarbon/bromine ratio in the blister gas for Comp Ex B demonstrates that the bromine associated with the tetrabromophthalate ester/ether polyol RB9170 in the polyisocyanurate matrix at a 1.5 wt % bromine loading is incapable of volatizing bromine into the blister gas with the thermal conditions that exist in forming the blister. The role of RB9170 is to provide a source of bromine that reduces the flammability of the combustible degradation products that are released during the char forming chemistry that occurs at temperatures greater than 350° C. For the Comp Ex A samples, the bromine concentration associated with nPB is 50% of the total bromine, or 1.5 wt %. Ex 2d demonstrates that using just the brominated primer layer can produce a concentration of bromine in the blister gas similar to that achieved with the entire nPB bromine loading of the 2.5 cm thick Comp Ex A sample. Examples 3a through 3d demonstrate, similarly, that other bromine sources in the primer layer can also yield similar hydrocarbon to bromine ratios in the blister gas.

Example 4: Flammability Testing Using ASTM E-84 Steiner Tunnel Test

In addition to the Lab Scale articles described in the previous examples, further embodiments of the current invention were performed using a "free rise" polyisocyanurate foam board production process as described in U.S. Pat. No. 4,028,158. Three foam laminate board samples with a total thickness of 10.2 cm (4.0 inches) were prepared using a constant PIR formulation as shown in Table 4 and containing two layers of non-woven, continuous strand, lightweight glass fiber mat (75 g/m²), positioned as described below.

TABLE 4

Components used in formulation to prepare polyisocyanurate foam boards.
PIR Components for Ex 4a,b,c

| Component | Parts* |
|---|---|
| A-Side | |
| PAPI 20 | 348 |
| SH 80/20 | 16.29 |
| B-Side | |
| Terate HT5502 | 100 |
| Vorasurf 504 | 4.0 |
| Saytex RB7940 | 31.82 |
| Water | 0.8 |
| SH 80/20 | 18.71 |
| Catalyst | |
| Pel-Cat 9887F | 9.0 |
| Formulation Index | |
| 406 | |

*Relative to 100 parts polyol

The well mixed (A-Side+B-Side) formulation was deposited atop the bottom aluminum foil plus bottom glass mat. The top glass mat and top Aluminum facer were then applied and the sandwiched structure was passed through metering rolls to distribute the liquid and provide a uniform thickness across the width of the structure. The Al foil plus glass fiber laminated polyisocyanurate formulation was then forwarded into a curing oven, which was thermostatically controlled at a temperature of 124° C. (255° F.) by circulating heated air. Heating from the oven and from the polymerization reaction caused expansion of the blowing agent and foaming of the polymer between the foils, causing the laminate to expand to its full 10.2 cm (4.0 inch) thickness by the end of the oven. The laminate was then trimmed on both sides to achieve a final width of 1.22 m (48 inch), and then cut into 2.44 m (8 ft) long board sections. These boards were then stacked into assemblies of 10 boards and stored in a warehouse. The foam inside the laminate boards had a density of 30.4 kg/m³ (1.9 lbs/ft³).

Foamed laminate structures were prepared in this manner using three different top Aluminum foil facer rolls; these samples are summarized in Table 5. Ex 4a used a standard, bromine-free primer, while samples Ex 4b and Ex 4c used two different coating weights of the same PMR-17628S proprietary primer composition used in Example 3; however, for Example 4, the suspension was used as supplied, without further dilution. In order to maintain consistency of foam properties, the large foam laminate board samples were made in one continuous run, utilizing "on the fly" transitions from one top facer to the next, without shutting down the process. The bottom aluminum foil for all three samples was constant, consisting of 0.0009" Dow Blue Tint Insulation Facer from Hannover Foils, LLC, Ashland Va., an aluminum foil with a thickness of 22.86 microns (0.9 mils) and a hydroxy-functional styrene-acrylate primer coating on the foam facing side.

TABLE 5

Summary of top facers used to prepare polyisocyanurate foam boards
Top Facers for Ex 4a,b,c

| Sampl | Aluminum Foil | Primer Layer |
|---|---|---|
| Ex 4a | Al foil (22.86 microns) | Dow Blue Tint (0 g Br/m$^2$) |
| Ex 4b | Al foil (22.86 microns) | PMR-17628S (7.7 g Br/m$^2$) |
| Ex 4c | Al foil (22.86 microns) | PMR-17628S (16.7 g Br/m$^2$) |

For all top facers (Ex 4a, Ex 4b, and Ex 4c), good adhesion of the top facer to the foam was observed. Foils peeled from the top surface of the articles exhibited a residue of polymer foam on the surface of the metal. After aging for 27 days, the three polyisocyanurate foam boards produced in Example 4 were subjected to the ASTM E-84 Steiner Tunnel Test at Intertek (Elmendorf, Tex., USA). Results from the testing are summarized in Table 6.

TABLE 6

Summary of E-84 test results on polyisocyanurate foam boards

| Sample | Flame Spread Index | Smoke Development Index | Classification |
|---|---|---|---|
| Ex 4a | 38 | 135 | Class B |
| Ex 4b | 17 | 200 | Class A |
| Ex 4c | 22 | 180 | Class A |

As shown in Table 6, both samples with facers that contained bromine in the primer layer (Ex 4b and Ex 4c) had significantly lower Flame Spread Index scores, earning a Class A rating, than the standard facer control (Ex 4a), which was rated Class B, as expected for the base PIR foam formulation. This ASTM E84 data demonstrates that even in larger scale flammability testing, incorporation of bromine in the primer between the aluminum foil and the foam significantly reduces the flammability of standard PIR foam laminate insulation boards.

What is claimed is:

1. An article comprising a polyurethane or polyisocyanurate foam having a primary surface, an aluminum facer covering, and a primer layer between and attached to the primary surface of the foam and the aluminum facer covering; wherein a primer component in the primer layer acts as an interfacial binder that binds both to the aluminum facer covering and the foam; wherein the article is characterized by:

(a) the primer layer having a concentration of bromine in said primer layer, comprising a primer component and a brominated component, where the primer component and brominated component are the same or different components;
(b) the primer layer is free of chlorinated components; and
(c) an absence of fibers in the form of fiber mats, fiber fabrics and dispersed fibers between the polyurethane or polyisocyanurate foam and the facer covering.

2. The article of claim 1, wherein the concentration of bromine in the primer layer is greater than 30 weight-percent relative to the combined weight of solids of the primer component and the brominated component.

3. The article of claim 1, wherein the concentration of bromine in the primer layer is 40 weight-percent or more relative to the combined weight of solids of the primer component and the brominated component.

4. The article of claim 1, wherein the brominated component is a brominated epoxy resin.

5. The article of claim 4, wherein the brominated epoxy resin has a weight average molecular weight that is 700 or more and 100,000 or less.

6. The article of claim 1, wherein the primer component and the brominated component are the same.

7. The article of claim 1, wherein the brominated component is a brominated styrene-butadiene copolymer.

8. The article of claim 1, wherein the primer layer has a glass transition temperature of 70 degrees Celsius or higher.

9. The article of claim 1, wherein the primer layer is free of halogenated components other than the brominated component.

10. The article of claim 1, wherein the primer layer is free of halogenated paraffin, a metal oxide of the arsenic group, and polyvinyl acetate.

11. The article of claim 1, wherein the polyurethane or polyisocyanurate foam is free of halogenated blowing agents.

12. The article of claim 1, wherein the polyurethane or polyisocyanurate foam is free of n-propyl bromide.

13. The article of claim 1, wherein the polyurethane or polyisocyanurate foam is a rigid foam having an index of 200 or greater.

14. The article of claim 1, wherein the polyurethane or polyisocyanurate foam is a polyisocyanurate foam.

15. The article of claim 1, wherein the aluminum facer covering has a thickness of 0.02 millimeters or greater.

* * * * *